US012439195B2

(12) United States Patent
Kobayashi

(10) Patent No.: US 12,439,195 B2
(45) Date of Patent: Oct. 7, 2025

(54) HEADPHONE

(71) Applicant: Yamaha Corporation, Hamamatsu (JP)

(72) Inventor: Chikara Kobayashi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 230 days.

(21) Appl. No.: 18/239,886

(22) Filed: Aug. 30, 2023

(65) Prior Publication Data

US 2024/0098400 A1 Mar. 21, 2024

(30) Foreign Application Priority Data

Sep. 15, 2022 (JP) ................................ 2022-146922

(51) Int. Cl.
*H04R 1/10* (2006.01)

(52) U.S. Cl.
CPC .......... *H04R 1/105* (2013.01); *H04R 1/1008* (2013.01); *H04R 1/1066* (2013.01)

(58) Field of Classification Search
CPC .... H04R 1/105; H04R 1/1008; H04R 1/1066; H04R 5/0335; H04R 1/10; H04R 1/1033
See application file for complete search history.

(56) References Cited

FOREIGN PATENT DOCUMENTS

| | | | | |
|---|---|---|---|---|
| EP | 1809068 A1 * | 7/2007 | .......... | H04R 1/1033 |
| JP | H10191491 A * | 7/1998 | .............. | H04R 1/10 |
| JP | 2018-88661 A | 6/2018 | | |

* cited by examiner

*Primary Examiner* — Angelica M McKinney
(74) *Attorney, Agent, or Firm* — Crowell & Moring LLP

(57) ABSTRACT

A headphone includes an outer arc-shaped headband including two strip-shaped guide portion respectively provided at both ends of the headband. The headphone further includes two speakers respectively connected to ends of the two guide portions. The headphone further includes an inner arc-shaped head pad including two sliders respectively provided at both ends of the head pad. Each slider includes an insertion hole through which the guide portion is inserted, a wall surface along which the guide portion slides, and a pressing portion that presses the guide portion toward the wall surface.

10 Claims, 7 Drawing Sheets

HEADPHONE

CROSS-REFERENCE TO RELATED APPLICATIONS

The present application claims priority to JP Patent Application No. 2022-146922, filed Sep. 15, 2022, the content of which is incorporated herein by reference.

BACKGROUND

Technological Field

The present disclosure relates to a headphone.

Background Information

Japanese Unexamined Patent Application, First Publication No. 2018-88661 (hereinbelow referred to as Patent Document 1) discloses a headphone in which a pair of speakers are connected by a headband. The headphone of Patent Document 1 has a slider provided on each speaker and slidable with respect to the headband, and a slider holding portion provided on the headband and slidably holding the slider. A slit is formed in the slider for allowing the slider to slide with respect to the slider holding portion. The slider holding portion has a pair of plate spring members that sandwich the slider, an insertion member that is inserted into the slit of the slider, and a fixing member that holds them. In the headphone of Patent Document 1, the relative positional relationship between the speakers and the headband can be adjusted by sliding the slider on the speaker side with respect to the headband and the slider holding portion.

However, in the headphone of Patent Document 1, both the speakers and the headband are provided with a structure (the slit of the slider and the slider holding portion) for slidably holding the speakers with respect to the headband. Moreover, the configuration of the slider holding portion is complicated. Therefore, maintenance of the headphone, especially maintenance of the headphone adjustment structure for adjusting the relative positional relationship between the speakers and the headband is troublesome. Maintenance is troublesome because, for example, in order to perform maintenance on the headphone adjustment structure, it is necessary to disassemble the slider holding portion in order to remove the slider holding portion from the headband.

Moreover, in the headphone of Patent Document 1, a structure for slidably holding the speakers with respect to the headband is provided in both the speakers and the headband, which increases the number of parts required for the structure. If the number of component parts of the headphone is large, problems arise such that it is difficult to manufacture the headphone at a low cost and assembly of the headphone is troublesome.

Further, the headphone disclosed in Patent Document 1 has a structure in which the slider holding portion holds the slider at a plurality of positions. For this reason, the slider can be held by the strong force of the slider holding portion, but when the slider is moved relative to the slider holding portion, the force holding the slider by the slider holding portion suddenly changes, resulting in catching. For this reason, when adjusting the position of the speakers, each speaker to which the slider is attached cannot be moved smoothly with respect to the headband. In other words, there is also the problem that the position adjustment of the speakers is troublesome.

SUMMARY

The present disclosure has been made in view of the circumstances described above, and it is an object of the present disclosure to provide a headphone capable of facilitating maintenance, capable of reducing the number of parts, and facilitating position adjustment of the speakers.

A first aspect of the present disclosure is a headphone that includes an outer arc-shaped headband including two strip-shaped guide portion respectively provided at both ends of the headband. The headphone further includes two speakers respectively connected to ends of the two guide portions. The headphone further includes an inner arc-shaped head pad including two sliders respectively provided at both ends of the head pad. Each slider includes an insertion hole through which the guide portion is inserted, a wall surface along which the guide portion slides, and a pressing portion that presses the guide portion toward the wall surface.

DETAILED DESCRIPTION OF THE DISCLOSURE

Embodiments of the present disclosure will be described below with reference to FIGS. 1 to 7.

Figure 1:
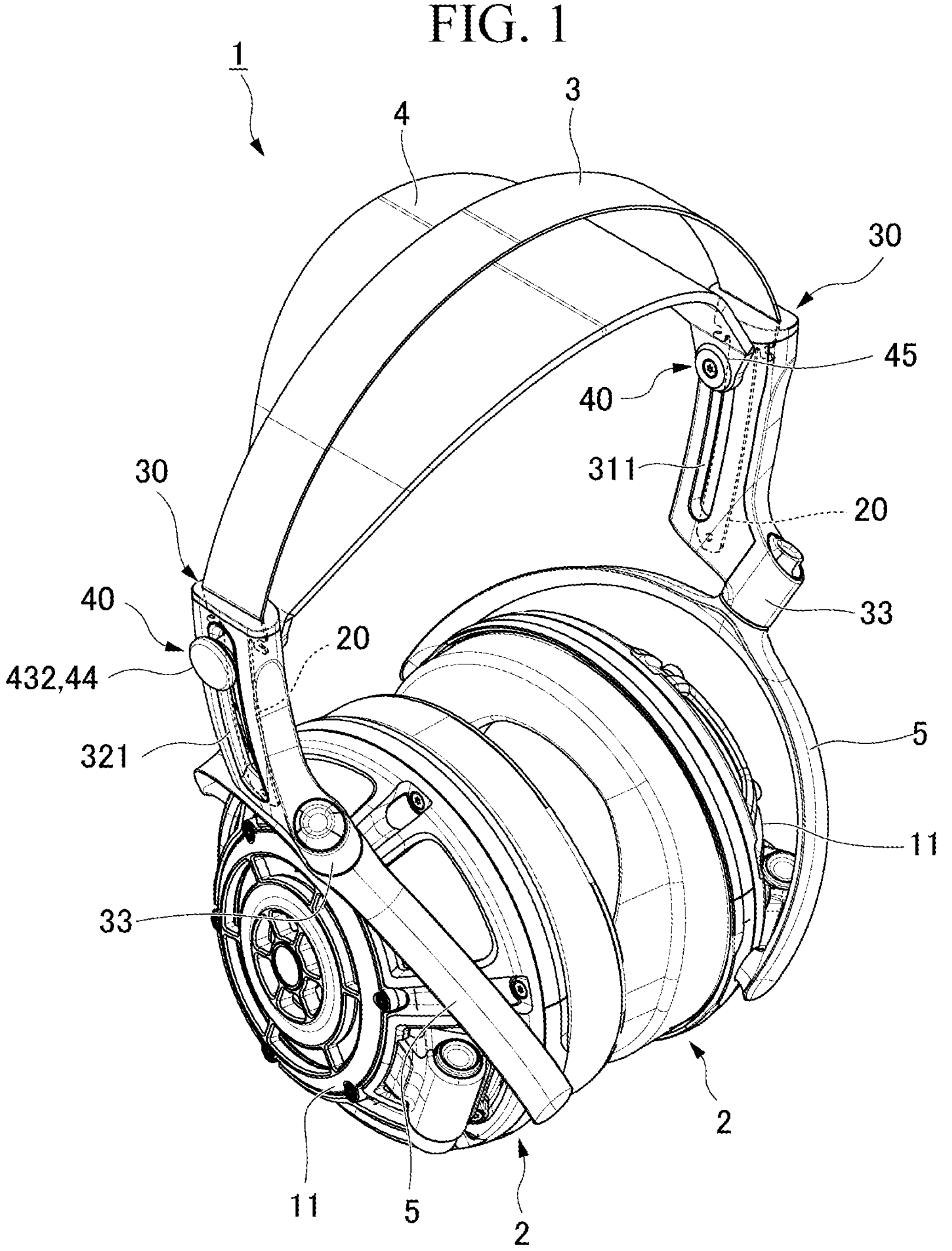
FIG. 1 is a perspective view showing a headphone according to an embodiment of the present disclosure.

As shown in FIG. 1, a headphone 1 of the present embodiment includes a pair of speakers 2, an outer arc-shaped headband 3, and an inner arc-shaped head pad 4.

The pair of speakers 2 each has a driver unit and a housing 11. The driver unit is configured to radiate sound by vibrating a diaphragm in response to an input signal. The housing 11 accommodates the driver unit.

The headband 3 is curved in the longitudinal direction thereof and has an arc-like external appearance. The headband 3 has a guide portion 20 and a guide holding portion 30.

Figure 2:
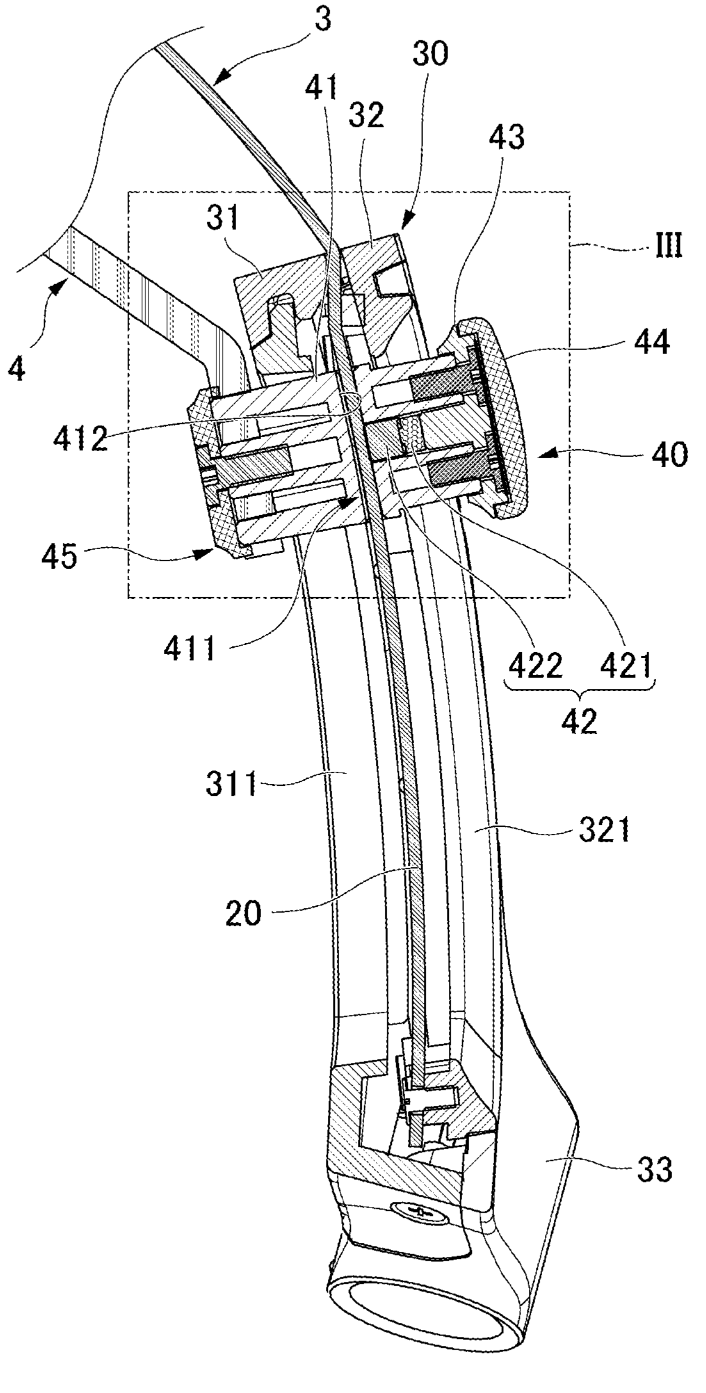
FIG. 2 is a cross-sectional view showing main portions of the headphone of FIG.
Figure 5:
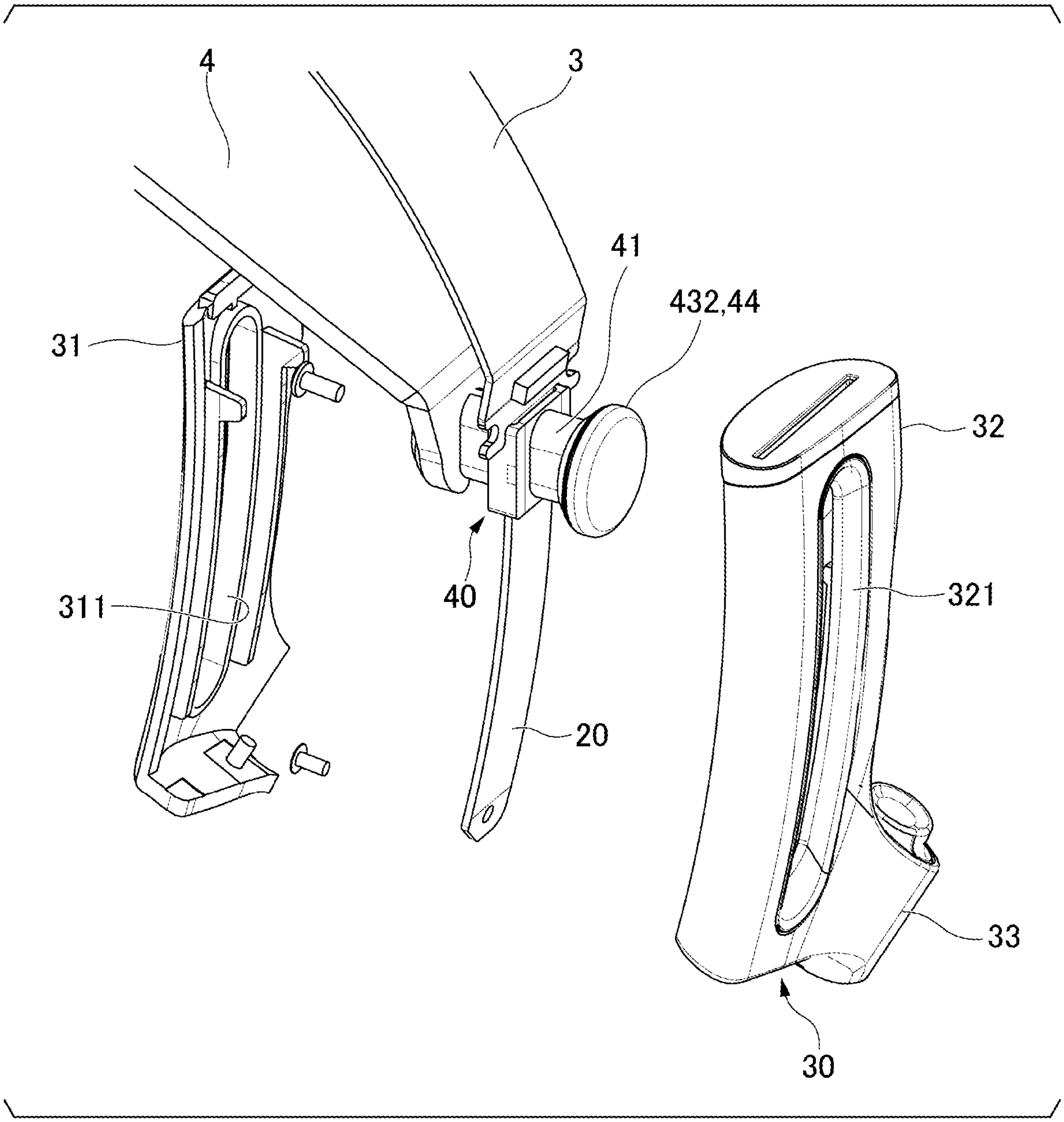
FIG. 5 is a perspective view showing a state in which the guide holding portion is removed from the guide portion in the headphone of FIGS. 1 to 3.

The guide portion 20 is provided at both ends of the headband 3 and is formed in the shape of a strip extending in the longitudinal direction of the headband 3. As shown in FIGS. 2 and 5, each guide portion 20 is curved in the longitudinal direction thereof. The guide portion 20 is curved in the same direction as the headband 3. The guide portion 20 is formed integrally with the headband 3. The headband 3, including the guide portion 20, is elastically deformable.

The guide holding portion 30, like the guide portion 20, is located at both ends of the headband 3 and is attached to each guide portion 20. As shown in FIG. 2, each guide holding portion 30 holds both ends of the guide portion 20 in the longitudinal direction so as to suppress or prevent bending deformation of the guide portion 20. Further, the guide holding portion 30 is formed so as to cover the guide portion 20 and a part of a slider 40 which will be described later.

As shown in FIGS. 2 and 5, the guide holding portion 30 has an inner member 31 and an outer member 32 that sandwich the guide portion 20 from the plate thickness direction thereof (that is, thickness direction of the guide holding portion 30). The inner member 31 is arranged on the inner side of the curved guide portion 20. The outer member 32 is arranged on the outer side of the curved guide portion 20. Slits 311 and 321 extending in the longitudinal direction of the guide portion 20 are formed in the inner member 31 and the outer member 32, respectively. The slider 40, to be described later, is inserted through the slits 311 and 321.

As shown in FIG. 1, the guide holding portion 30 has a mounting portion 33 for mounting the speaker 2 thereon. The mounting portion 33 is integrally formed with a portion of the guide holding portion 30 (tip portion of the guide holding portion 30) corresponding to the tip of the guide portion 20 in the longitudinal direction. The speaker 2 is mounted to the mounting portion 33 via a hanger 5 that supports the speaker 2 in a swingable manner. The speaker 2 may for example be directly mounted to the mounting portion 33. By mounting the speaker 2 to the guide holding portion 30, the speaker 2 is indirectly connected to the tip of the guide portion 20.

The head pad 4 has a generally arc-shaped appearance similar to the headband 3 and is positioned to the inside of the headband 3. The head pad 4 may have flexibility, for example, or may be elastically flexible and deformable similar to the headband 3. The head pad 4 has the slider 40 that allows the guide portion 20 to be inserted at both ends of the longitudinal direction thereof.

Figure 3:
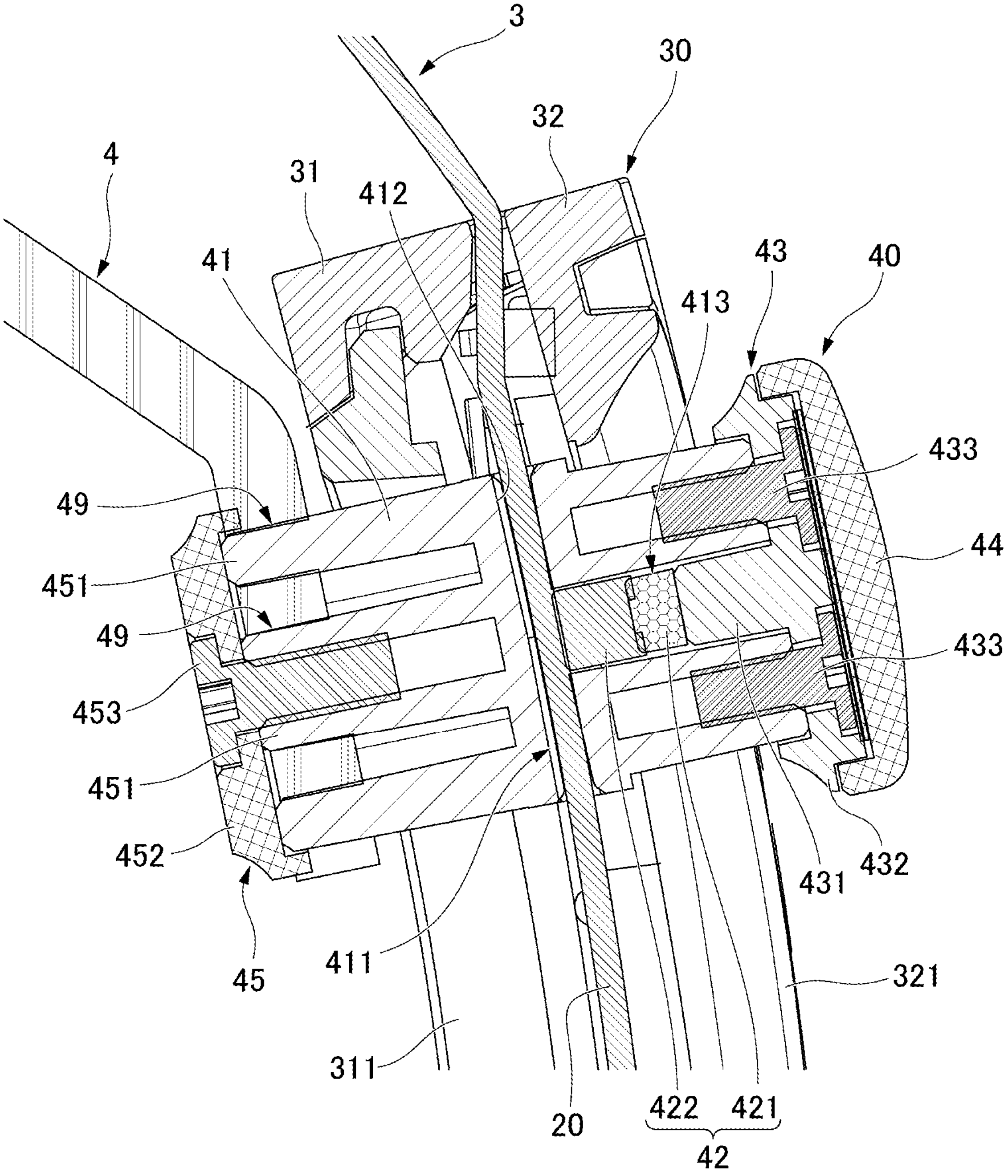
FIG. 3 is a cross-sectional view showing an enlarged region III of FIG. 2.
Figure 4:
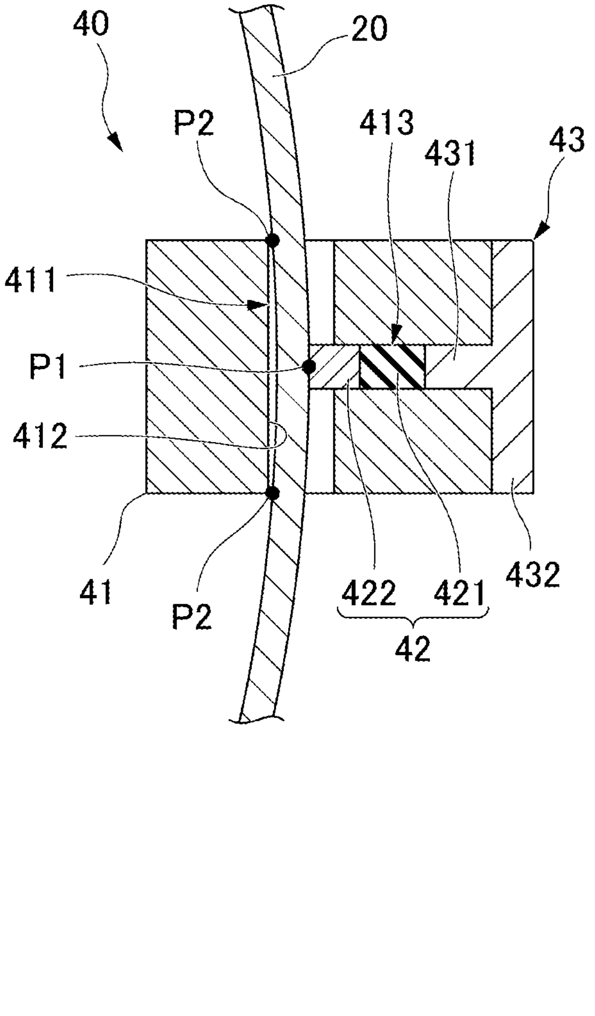
FIG. 4 is a diagram schematically showing the relationship between the guide portion and the slider in FIGS. 2 and 3.

As shown in FIGS. 2 to 4, each slider 40 has an insertion hole 411, a wall surface 412, and a pressing portion 42. The insertion hole 411 is a hole through which the guide portion 20 is inserted. The wall surface 412 is a surface (sliding surface) on which the guide portion 20 which has been inserted through the insertion hole 411 slides. The pressing portion 42 presses the guide portion 20 inserted through the insertion hole 411 toward the wall surface 412. The slider 40 of the present embodiment will be specifically described below.

As shown in FIGS. 3, 4, 6 and 7, the slider 40 of the present embodiment has a slider body 41, the pressing portion 42, and a pressing adjustment portion 43.

The slider body 41 has the insertion hole 411 described above. The insertion hole 411 of the present embodiment is formed continuously from one end to the other end of the slider body 41 in the insertion direction of the guide portion 20. Therefore, the wall surface 412 of the slider 40 described above is formed by the inner surface of the insertion hole 411. Moreover, the insertion hole 411 of the present embodiment extends linearly. The insertion hole 411 may be curved similarly to the guide portion 20, for example.

Figure 6:
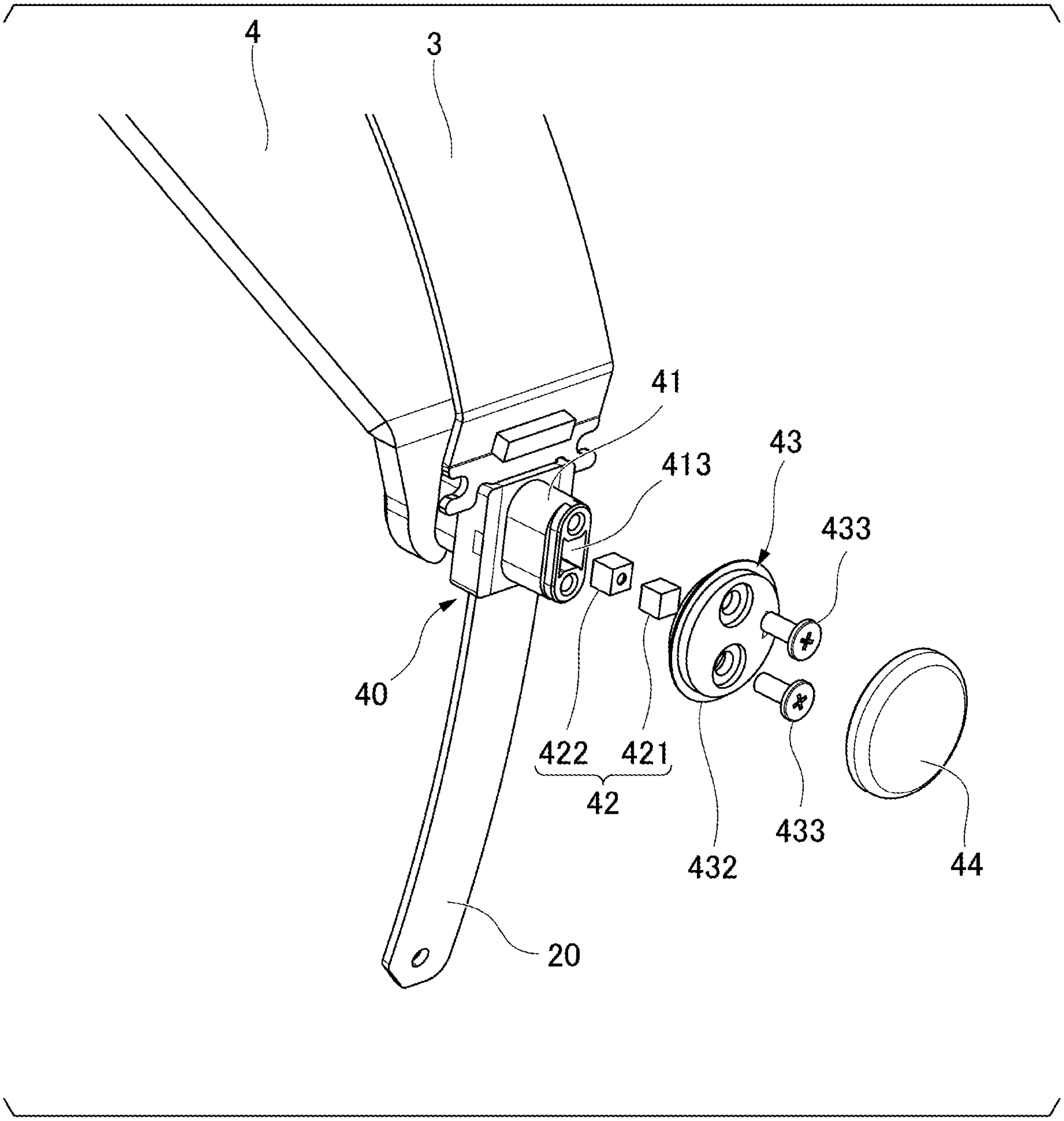
FIG. 6 is an exploded perspective view of part of the slider in the configuration of FIG. 5.

The slider body 41 further has an insertion hole 413 into which the pressing portion 42 is inserted. It is sufficient that the insertion hole 413 is open at least to the inner surface of the insertion hole 411. In the present embodiment, the insertion hole 413 penetrates from the outer surface to the inner surface of the slider body 41. In FIG. 6, the plan view shape of the insertion hole 413 when viewed from the direction of penetration of the insertion hole 413 is rectangular. The plan view shape of the insertion hole 413 may be arbitrary, such as a circular shape, for example.

The pressing portion 42 is formed separately from the slider body 41 and is attached to the slider body 41. Specifically, the pressing portion 42 is inserted into the insertion hole 413 of the slider body 41 described above. The pressing portion 42 of the present embodiment includes an elastic member 421 and a contact member 422.

The elastic member 421 is an elastically deformable member. The elastic member 421 of the present embodiment is silicone rubber. Note that the elastic member 421 may be other rubber or a spring (for example, a spring coil). The pressing portion 42 of the present embodiment uses the elastic force of the elastic member 421 to press the guide portion 20 toward the wall surface 412 of the slider body 41.

The contact member 422 is a member that is pressed against the guide portion by the elastic force of the elastic member 421. The contact member 422 of the present embodiment has a higher elastic modulus than the elastic member 421. That is, the contact member 422 is harder than the elastic member 421. The contact member 422 may be, for example, POM (polyacetal), but the material thereof is not limited thereto.

The elastic member 421 and the contact member 422 are arranged in order from the outer surface side of the slider body 41 to the insertion hole 413 of the slider body 41 while being inserted into the insertion hole 413 of the slider body 41.

The elastic member 421 and the contact member 422 have different shapes. Specifically, the elastic member 421 and the contact member 422 have different lengths in the penetration direction of the insertion hole 413 when the elastic member 421 is not elastically deformed. The elastic member 421 and the contact member 422 have the same shape when viewed from the penetration direction of the insertion hole 413, being rectangular with a size corresponding to the plan view shape of the insertion hole 413. Accordingly, it is possible to prevent the elastic member 421 and the contact member 422 from rotating about the penetration direction of the insertion hole 413 while being inserted into the insertion hole 413.

The pressing portion 42 of the present embodiment presses the guide portion 20 from the outer side of the curved guide portion 20 toward the wall surface 412 of the slider body 41. Therefore, the wall surface 412 of the slider body 41 against which the guide portion 20 is pressed by the pressing portion 42 is positioned so as to be in contact with the inner side of the curved guide portion 20.

Figure 7:
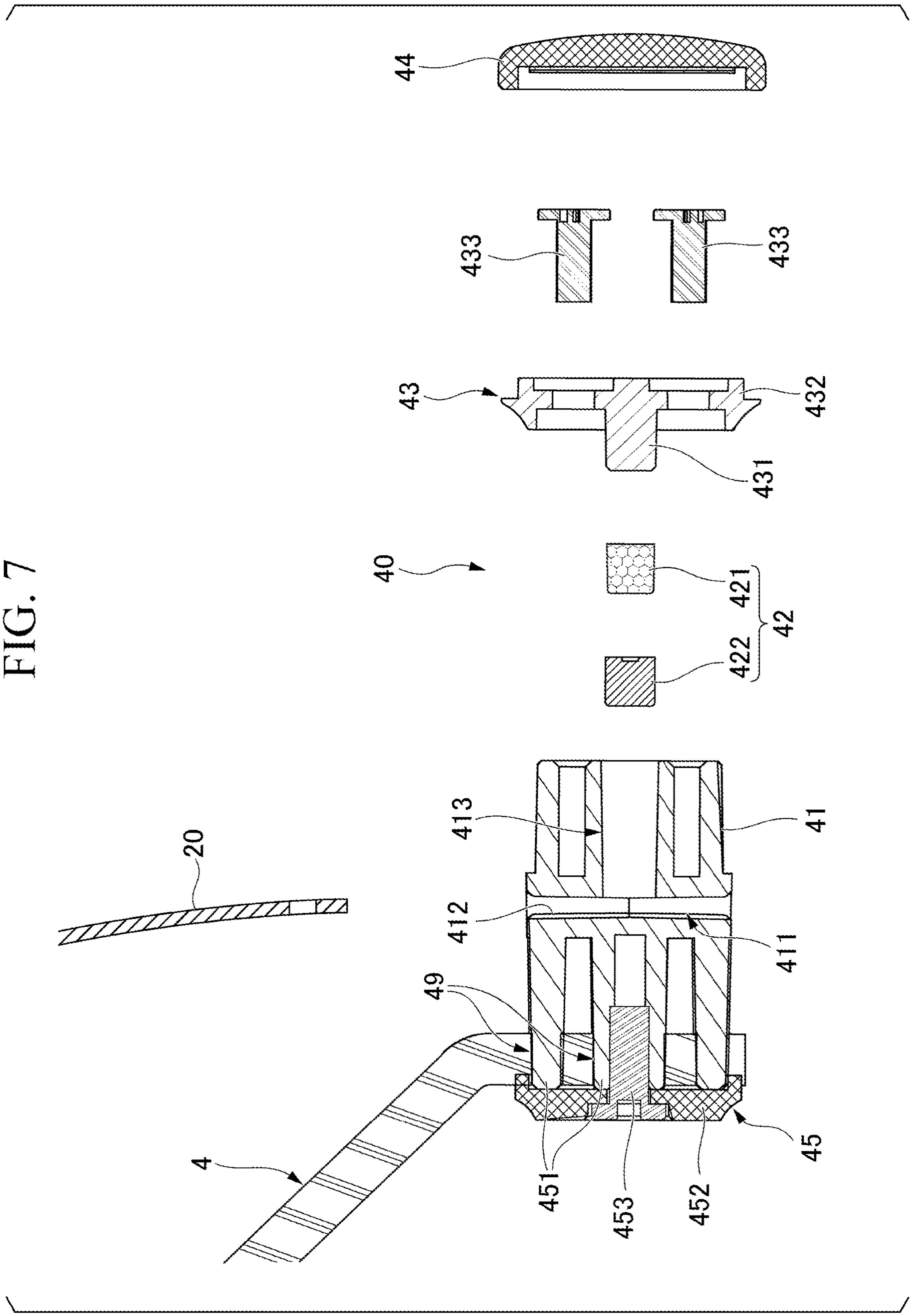
FIG. 7 is a cross-sectional view showing a state in which the slider is partly disassembled and the guide portion is extracted from the slider body in the configuration of FIG. 5.

As shown in FIG. 7, the pressing adjustment portion 43 adjusts the force with which the pressing portion 42 presses the guide portion 20 inserted into the insertion hole 411 of the slider body 41. The pressing adjustment portion 43 of the present embodiment has a push-in portion 431. The push-in portion 431 is inserted into the insertion hole 413 from the outer surface side of the slider body 41. As a result, the push-in portion 431 pushes the pressing portion 42 inserted into the insertion hole 413 toward the insertion hole 411 side by a predetermined length.

The pressing adjustment portion 43 further has a lid portion 432. The lid portion 432 is arranged over the outer surface of the slider body 41 where the insertion hole 413 opens, and covers the opening of the insertion hole 413. The push-in portion 431 is formed integrally with the lid portion 432. The push-in portion 431 may be formed separately from the lid portion 432 and fixed to the lid portion 432, for example. The push-in portion 431 is inserted into the insertion hole 413 by the lid portion 432 covering the opening of the insertion hole 413. The lid portion 432 is fixed to the slider body 41 with fixing screws 433 in a state of covering the opening of the insertion hole 413. A blindfold plate (cover plate) 44 is attached to the lid portion 432 to hide the fixing screws 433 that secure the lid portion 432 to the slider body 41. The lid portion 432 fixed to the slider body 41 and the blindfold plate 44 attached thereto protrude outside the edge of the slider body 41 when viewed from the penetrating direction of the insertion hole 413. The lid portion 432 and blindfold plate 44 function as an operation portion for the user of the headphone 1 to move the slider 40 with respect to the guide portion 20 in the longitudinal direction thereof.

In the pressing adjustment portion 43 of the present embodiment configured as described above, by adjusting the length of the push-in portion 431 inserted into the insertion hole 413 of the slider body 41, it is possible to adjust the length pushing the pressing portion 42 inserted into the insertion hole 413 toward the insertion hole 411 side. Thereby, the force with which the pressing portion 42 presses the guide portion 20 can be adjusted by the pressing adjustment portion 43. The length of the push-in portion 431 inserted into the insertion hole 413 may be adjusted by adjusting the length of the push-in portion 431 protruding from the lid portion 432.

As shown in FIG. 1, the slider 40 is attached to both ends of head pad 4. The structure that attaches the slider 40 to the head pad 4 will be described below.

As shown in FIGS. 3 and 7, the slider 40 has a head pad holding portion 45 that holds the end of the head pad 4. The head pad holding portion 45 has an insertion protrusion 451 provided on the slider body 41 and a retaining member 452 attached to the tip of the insertion protrusion 451.

The insertion projection 451 is positioned on the inner side of the guide portion that is inserted into the insertion hole 411 of the slider body 41. The insertion projection 451 is inserted in a hole 49 formed at the end of the head pad 4. In the illustrated example, the number of insertion projections 451 of the slider body 41 and the number of holes 49 of the head pad 4 corresponding thereto are two, but the number is not limited thereto.

The retaining member 452 is attached to the tips (ends) of the insertion projections 451 to prevent the end of the head pad 4 from coming off from the insertion projections 451. The retaining member 452 is fixed to the slider body 41 with a fixing screw 453. By inserting each insertion projection 451 of the slider body 41 into the hole 49 at the end of the head pad 4 and fixing the retaining member 452 to the tip of the insertion projection 451, the end of the head pad 4 is held by the slider 40 at the inner side of the guide portion 20.

As shown in FIGS. 2 and 3, in the slider 40 of the present embodiment, a portion of the slider body 41 located on the outer side of the curved guide portion 20 is inserted through the slit 321 of the outer member 32 of the guide holding portion 30 and protrudes outside the guide holding portion 30. The lid portion 432 and the blindfold plate 44 of the pressing adjustment portion 43 functioning as the operation portion of the slider 40 are positioned on the outer side of the outer member 32. On the other hand, the portion of the slider body 41 located on the inner side of the curved guide portion 20 is inserted through the slit 311 of the inner member 31 of the guide holding portion 30 and protrudes outside the guide holding portion 30. The head pad holding portion 45 of the slider 40 is positioned outside the inner member 31.

In the headphone 1 of the present embodiment configured as described above, the guide portion 20 of the headband 3 is inserted into the insertion hole 411 of the slider of the head pad 4, allowing the slider 40 to slide in the longitudinal direction of the guide portion 20. Sliding the slider 40 with respect to the guide portion 20 changes the relative positional relationship between the pair of speakers 2 and the head pad 4. By adjusting the relative positional relationship between the pair of speakers 2 and the head pad 4 as appropriate, the head pad 4 can be positioned along the user's head, and at the same time, the pair of speakers 2 can be placed at positions corresponding to the user's two ears.

Further, the guide portion 20 is sandwiched between the pressing portion 42 of the slider 40 and the wall surface 412 by being pressed against the wall surface 412 of the slider 40 by the pressing portion 42 of the slider 40. Thereby, the slider 40 can be held at a predetermined position in the longitudinal direction of the guide portion 20.

As described above, in the headphone 1 of the present embodiment, the structure for sliding and holding the slider 40 with respect to the guide portion 20, that is, the insertion hole 411 and the pressing portion 42, are both provided in the slider 40, and are not provided in the guide portion 20. That is, the structure for sliding and holding the slider 40 with respect to the guide portion 20 is concentrated in the slider 40. This allows the slider 40 to be removed from the guide portion 20 without disassembly. This makes it easy to perform maintenance on the adjustment structure of the headphone 1 for adjusting the headphone 1, particularly the relative positional relationship between the speaker 2 and the head pad 4 as needed.

Further, in the headphone 1 of the present embodiment, the structure for sliding and holding the slider 40 with respect to the guide portion 20 is concentrated in the slider 40, which allows for a reduction in the number of parts required for the structure. Moreover, the headphone 1 can be manufactured at a low cost. Furthermore, it becomes possible to easily assemble the headphone 1.

Further, in the headphone 1 of the present embodiment, the pressing portion 42 of the slider 40 presses against the guide portion 20 at one point, that is, the slider 40 is held by the guide portion 20 at one point. Therefore, even if the slider 40 is moved with respect to the guide portion 20, it is possible to suppress a sudden change in the force with which the pressing portion 42 presses the guide portion 20 (that is, the force that holds the slider 40). From this, when adjusting the relative positional relationship between the pair of speakers 2 and the head pad 4, the slider 40 can be smoothly moved with respect to the guide portion 20, and the sliding feeling when moving the slider 40 is light. Therefore, the position adjustment of the speaker 2 can be easily performed.

Further, in the headphone 1 of the present embodiment, the slider 40 is held by the guide portion 20 by the pressing portion 42 of the slider 40 pressing against the guide portion 20. Therefore, there is also the advantage that the slider 40 is less likely to move with respect to the guide portion 20 while the user is wearing the headphone 1.

Further, in the slider 40 of the headphone 1 of the present embodiment, the pressing portion 42 that presses the guide portion 20 against the wall surface 412 of the slider 40 is formed separately from the slider body 41 through which the guide portion 20 is inserted, and is attached to the slider 40. Therefore, even if the pressing portion 42 rubs against the guide portion 20 and wears out as a result of sliding the slider 40 against the guide portion 20, only the pressing portion 42 of the slider 40 needs to be replaced. As a result, the maintenance cost of the headphone 1 can be kept low compared to the case where the entire slider 40 is replaced.

Moreover, in the headphone 1 of the present embodiment, the pressing portion 42 of the slider 40 includes an elastic member 421 that is elastically deformable. As a result, the elastic force of the elastic member 421 of the pressing portion 42 can be used to press the guide portion 20 against the wall surface 412 of the slider body 41.

Furthermore, in the headphone 1 of the present embodiment, the pressing portion 42 further has a contact member 422 that is pressed against the guide portion 20 by the elastic force of the elastic member 421. Therefore, a member harder than the elastic member 421 can be used as the contact member 422. As a result, compared to the case where the elastic member 421 is pressed against the guide portion 20, even if the pressing portion 42 rubs against the guide portion 20 as a result of the sliding of the slider 40 with respect to the guide portion 20, wear of the pressing portion 42 can be effectively suppressed. Therefore, the frequency of maintenance of the headphone 1 can be reduced.

Further, when the contact member 422 is pressed against the guide portion 20, there is the advantage that the pressing portion 42 is less likely to leave a trace of contact (contact mark) on the guide portion 20 compared to the case where the elastic member 421 is pressed against the guide portion 20.

Moreover, in the headphone 1 of the present embodiment, the shapes of the elastic member 421 and the contact member 422 are different from each other. As a result, when the pressing portion 42 is attached to the slider body 41, even if the sizes and colors of the elastic member 421 and the contact member 422 are the same, it is possible to prevent errors in the attachment positions of the elastic member 421 and the contact member 422 with respect to the slider body 41. In other words, it is possible to prevent the incorrect assembly of the slider 40.

Moreover, in the headphone 1 of the present embodiment, the slider 40 has a pressing adjustment portion 43 that adjusts the force with which the pressing portion 42 presses the guide portion 20. Therefore, the force with which the pressing portion 42 presses the guide portion 20 can be appropriately adjusted by the pressing adjustment portion 43. Thereby, the slider 40 can be slid in the longitudinal direction of the guide portion 20 while the slider 40 is held at a predetermined position in the longitudinal direction of the guide portion 20.

Further, in the headphone 1 of the present embodiment, the slider body 41 has an insertion hole 413 that penetrates from the outer surface to the inner surface of the slider body 41 and into which the pressing portion 42 is inserted. The pressing adjustment portion 43 has a push-in portion 431 that pushes the pressing portion 42 toward the insertion hole 411 by a predetermined length by being inserted into the insertion hole 413 side from the outer surface side of the slider body 41. By adjusting the length by which the push-in portion 431 pushes the pressing portion 42 toward the insertion hole 411 side, the force with which the pressing portion 42 presses the guide portion 20 can be adjusted.

Moreover, in the headphone 1 of the present embodiment, the guide portion 20 is curved so as to correspond to the outer arc shape of the headband 3. Therefore, when the user wears the headphone 1, the gap between the headband 3 (or the guide holding portion 30) and the user's head can be reduced while the pair of speakers 2 are in contact with both ears of the user. This allows the user to wear the headphone 1 in a more stable state.

Furthermore, in the headphone 1 of the present embodiment, the pressing portion 42 of the slider 40 presses the guide portion 20 from the outer side of the curved guide portion 20 toward the wall surface 412 of the slider 40. Therefore, even if the curvature of the curved guide portion 20 is not constant in the longitudinal direction of the guide portion 20 but varies, the force that clamps the guide portion 20 between the pressing portion 42 of the slider 40 and the wall surface 412 can be effectively controlled to vary with the position of the guide portion 20 in the longitudinal direction. This point will be described below.

As shown in FIG. 4, the curved guide portion 20 is sandwiched between one pushing point P1, which is pressed by the pressing portion 42 of the slider 40 on the outer side of the guide portion 20, and two support points P2 located on the inner side of the curved guide portion 20 at both ends of the wall surface 412 of the slider 40 in the longitudinal direction of the guide portion 20. This manner of clamping the guide portion 20 does not change even if the curvature of the guide portion 20 changes. Accordingly, even if the position of the slider 40 with respect to the guide portion 20 changes in the longitudinal direction of the guide portion 20, it is possible to prevent variations in the force that sandwiches the guide portion 20 between the pressing portion 42 of the slider 40 and the wall surface 412.

By prevent variations in the force that sandwiches the guide portion 20 between the pressing portion 42 and the wall surface 412, it is possible to prevent changes (for example, abrupt changes) in the force required to slide the slider 40 in the longitudinal direction of the guide portion 20 depending on the longitudinal position of the guide portion 20. From this, when adjusting the relative positional relationship between the pair of speakers 2 and the head pad 4, the slider 40 can be smoothly moved with respect to the guide portion 20, and the sliding feeling when moving the slider 40 is light. Therefore, the user of the headphone 1 can easily adjust the relative positional relationship between the pair of speakers 2 and the head pad 4.

In addition, by suppressing variations of the force that clamps the guide portion between the pressing portion 42 of the slider 40 and the wall surface 412 depending on the longitudinal position of the guide portion 20, it is also possible to suppress variations in the force that holds the slider 40 on the guide portion 20 depending on the longitudinal position of the guide portion 20. Therefore, regardless of the position of the slider 40 on the guide portion 20, there is also the advantage that the slider 40 is less likely to move with respect to the guide portion 20 when the user wears the headphone 1.

Further, in the headphone 1 of the present embodiment, the wall surface 412 of the slider 40 against which the guide portion 20 is pressed by the pressing portion 42 is constituted by the inner surface of the insertion hole 411 of the slider body 41. Therefore, compared to the case where the wall surface 412 of the slider 40 is made of a member different from the slider body 41, the slider 40 can be manufactured easily and inexpensively. Further, compared to the case where the wall surface 412 of the slider is made of a member different from the slider body 41, the guide portion 20 can be easily inserted into the insertion hole 411 of the slider 40 and easily attached to the slider 40.

While preferred embodiments of the disclosure have been described and illustrated above, it should be understood that these are exemplary of the disclosure and are not to be considered as limiting. Additions, omissions, substitutions, and other modifications can be made without departing from the scope of the present disclosure. Accordingly, the disclosure is not to be considered as being limited by the foregoing description, and is only limited by the scope of the appended claims.

In the present disclosure, the pressing adjustment portion 43 may include the pressing portion 42, for example. For example, by adjusting the length of the pressing portion 42 inserted into the insertion hole 413 (for example, the length of the elastic member 421 and/or the contact member 422), the force with which the pressing portion 42 presses the guide portion 20 inserted into the insertion hole 411 of the slider body 41 can be adjusted.

In the present disclosure, the pressing portion 42 may include only the elastic member 421, for example. In this case, the elastic member 421 of the pressing portion 42 is pressed against the guide portion 20.

Alternatively, the pressing portion 42 may include only the contact member 422, for example.

In the present disclosure, the pressing portion 42 may be, for example, a projection formed integrally with the slider body 41 and protruding from the inner surface of the slider body 41 (for example, the inner surface of the insertion hole 411).

In the present disclosure, the headband 3 may not include the guide holding portion 30, for example. In this case, the speaker 2 may be directly attached to the tip of the guide portion 20 of the headband 3, for example.

In the present disclosure, the insertion hole 411 of the slider body 41 may be formed, for example, only at one end and the other end of the slider body 41 in the insertion direction of the guide portion 20, and the interior of the slider body 41 may be hollow. In this case, the wall surface 412 of the slider 40 on which the guide portion 20 slides inside the slider body 41 may be configured by another member arranged inside the slider body 41, for example.

If the wall surface 412 of the slider 40 is composed of another member arranged inside the slider body 41, even if the wall surface 412 rubs against the guide portion 20 and wear down due to the wall surface 412 of the slider 40 sliding against the guide portion 20, only the separate member including the wall surface 412 of the slider 40 needs to be replaced. As a result, the maintenance cost of the headphone can be kept low compared to the case where the entire slider 40 is replaced.

According to the present disclosure, it is possible to provide a headphone that can be easily maintained, has a reduced number of parts, and also allows for easy adjustment of the speaker position.

What is claimed is:

1. A headphone comprising:

an outer arc-shaped headband comprising two strip-shaped guide portions respectively provided at both ends of the headband;

two speakers respectively connected to ends of the two guide portions; and an inner arc-shaped head pad comprising two sliders respectively provided at both ends of the head pad, wherein each slider comprises an insertion hole through which the guide portion is inserted, a wall surface along which the guide portion slides, and a pressing portion that presses the guide portion toward the wall surface.

2. The headphone according to claim 1, wherein each slider comprises a slider body comprising the insertion hole, and wherein the pressing portion is provided separately from the slider body and is attached to the slider body.

3. The headphone according to claim 2, wherein the pressing portion comprises an elastic member capable of elastic deformation.

4. The headphone according to claim 3, wherein the pressing portion comprises a contact member that is pressed against the guide portion by an elastic force of the elastic member.

5. The headphone according to claim 4, wherein a shape of the elastic member and a shape of the contact member are different from each other.

6. The headphone according to claim 2, wherein each slider comprises a pressing adjustment portion configured to adjust a force with which the pressing portion presses the guide portion.

7. The headphone according to claim 6, wherein the slider body comprises a second insertion hole penetrating from an outer surface of the slider body to an inner surface of the slider body, wherein the pressing portion is inserted into the second insertion hole, and wherein the pressing adjustment portion comprises a push-in portion configured to push the pressing portion toward the second insertion hole by a predetermined length by being inserted into the second insertion hole from a side of the outer surface.

8. The headphone according to claim 1, wherein the guide portion is curved, and the pressing portion is configured to press against the guide portion from an outer side of the curved guide portion toward the wall surface.

9. The headphone according to claim 1, wherein each slider comprises a slider body comprising the insertion hole, and wherein the wall surface comprises an inner surface of the insertion hole.

10. The headphone according to claim 1, wherein each slider comprises a slider body comprising the insertion hole, and wherein the wall surface comprises a member that is different from the slider body and that is arranged inside the slider body.

* * * * *